(12) United States Patent  
Hansen et al.

(10) Patent No.: US 7,935,888 B2
(45) Date of Patent: May 3, 2011

(54) PROTECTIVE COVER ARRANGEMENT FOR AN ELECTRICAL UNIT

(75) Inventors: Kristoffer Riemann Hansen, Broager (DK); Dirk Homuth, Flensburg (DE); Hans Peter Kristensen, Aabenraa (DK)

(73) Assignee: Danfoss Compressors GmbH, Flensburg (DE)

( * ) Notice: Subject to any disclaimer, the term of this patent is extended or adjusted under 35 U.S.C. 154(b) by 267 days.

(21) Appl. No.: 12/185,952

(22) Filed: Aug. 5, 2008

(65) Prior Publication Data
US 2009/0065233 A1 Mar. 12, 2009

(30) Foreign Application Priority Data

Aug. 14, 2007 (DK) .................................. 2007 01157

(51) Int. Cl.
H02G 3/14 (2006.01)
(52) U.S. Cl. ............. 174/66; 174/67; 439/140; 220/241
(58) Field of Classification Search .................... 174/66, 174/67; 220/241, 242; 439/135, 131, 954, 439/139–142
See application file for complete search history.

(56) References Cited

U.S. PATENT DOCUMENTS

| | | | |
|---|---|---|---|
| 4,449,015 A * | 5/1984 | Hotchkiss et al. ......... | 174/138 F |
| 5,392,197 A | 2/1995 | Cuntz et al. | |
| 5,664,955 A * | 9/1997 | Arnett .......................... | 439/135 |
| 5,700,156 A * | 12/1997 | Bussard et al. ............... | 439/471 |

(Continued)

FOREIGN PATENT DOCUMENTS
JP 2000161221 A 6/2000
(Continued)

OTHER PUBLICATIONS

News Release Issued by Ticona entitled, "Ticona: First Commerical System for Overmolding TPE onto Acetal", dated Aug. 15, 2001, pp. 1-2.

(Continued)

*Primary Examiner* — Dhiru R Patel
(74) *Attorney, Agent, or Firm* — McCormick, Paulding & Huber LLP

(57) ABSTRACT

A protective cover arrangement (1) for a first electrical unit, e.g. a starter unit (3), mountable on a second electrical unit, e.g. a compressor (2). The protective cover arrangement (1) comprises an outer cover (5) and an inner cover (6). The outer cover (5) comprises mounting parts (8) adapted to cooperate with mounting parts (10) on the second electrical unit in order to mount the outer cover (5) on the second electrical unit. The inner cover (6) is sized and shaped to fit inside the outer cover (5), and it is adapted to accommodate a first electrical unit in an interior part (7). The inner cover (6) comprises an opening (12) allowing electrical connectors (4) to pass from the second electrical unit to the interior part (7), thereby providing electrical connection between the first electrical unit and the second electrical unit. The inner cover (6) further comprises a cable entry structure (9) allowing one or more electrical cables to pass from the exterior of the protective cover arrangement (1) to the interior part (7) of the inner cover (6), thereby providing power supply for the electrical units. The cable entry structure (9) defines one or more cable guides, each defining a curved cable path. The inner cover (6) provides additional protection against moisture and/or dust, and it can be added to the arrangement (1) without significantly changing the design of the other components. It is possible to retrofit the inner cover (6) onto operating devices.

15 Claims, 7 Drawing Sheets

U.S. PATENT DOCUMENTS

| | | | |
|---|---|---|---|
| 6,956,169 B1 * | 10/2005 | Shotey et al. | 174/58 |
| 6,979,212 B1 * | 12/2005 | Gorman | 439/140 |
| 7,189,922 B1 | 3/2007 | Rose et al. | |
| 2002/0163785 A1 | 11/2002 | Brechbill et al. | |
| 2003/0012669 A1 | 1/2003 | Kawashima et al. | |
| 2004/0179966 A1 | 9/2004 | Kawashima et al. | |

FOREIGN PATENT DOCUMENTS

JP  2004140956  5/2004

OTHER PUBLICATIONS

Danish Search Report for PA 2007 01157, dated Mar. 11, 2008.

* cited by examiner

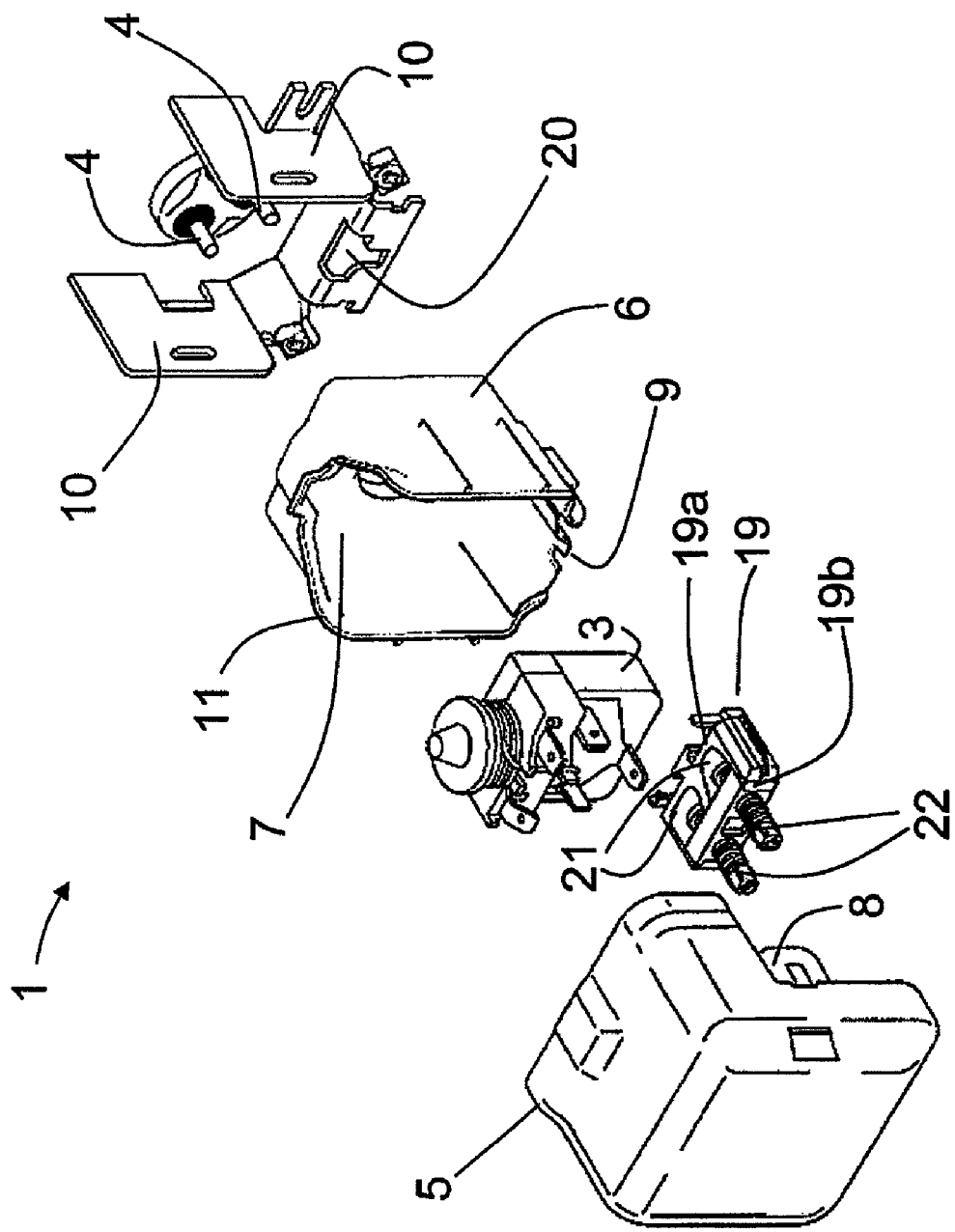

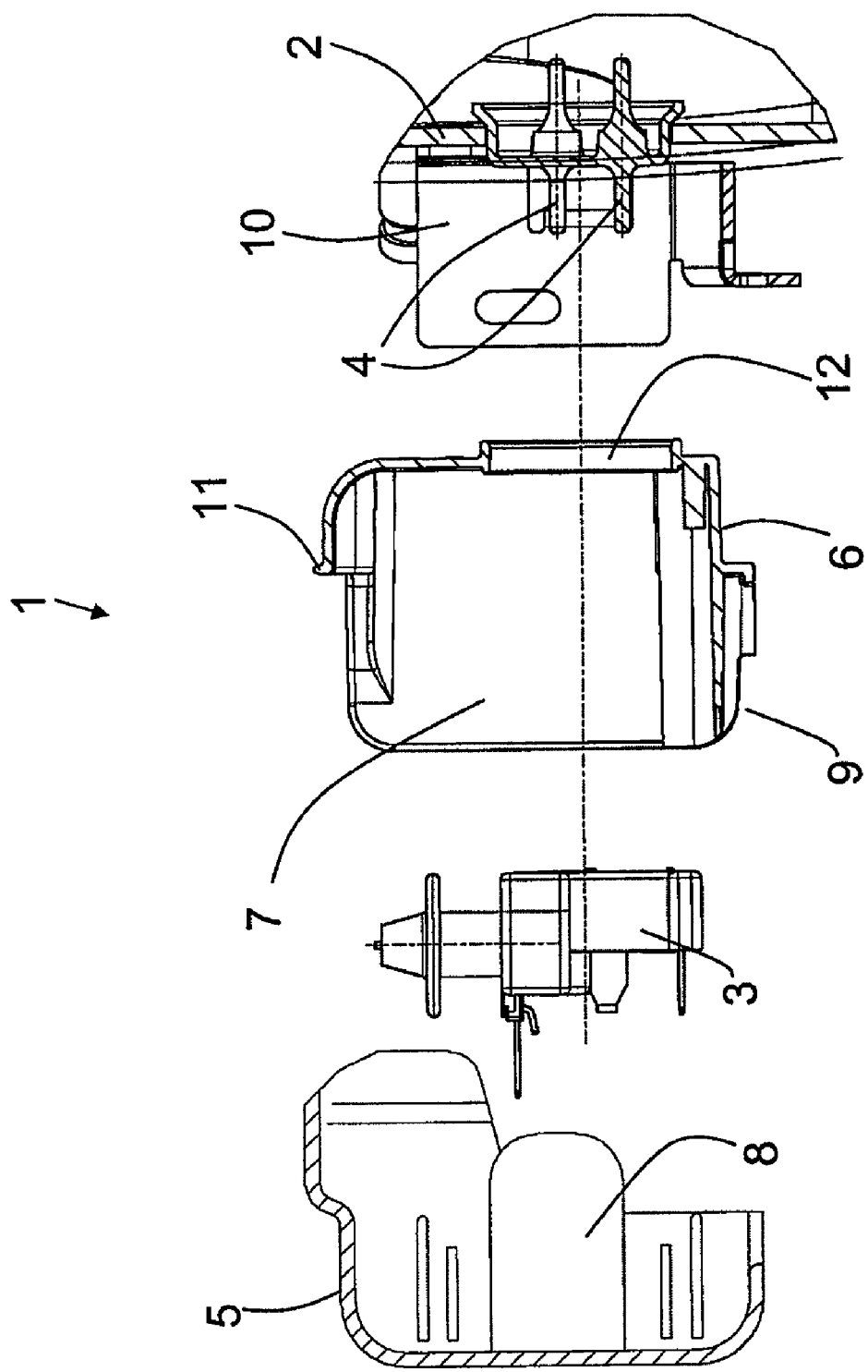

US 7,935,888 B2

PROTECTIVE COVER ARRANGEMENT FOR AN ELECTRICAL UNIT

CROSS REFERENCE TO RELATED APPLICATIONS

Applicant hereby claims foreign priority benefits under U.S.C. §119 from Danish Patent Application No. PA 2007 01157 filed on Aug. 14, 2007, the contents of which are incorporated by reference herein.

FIELD OF THE INVENTION

The present invention relates to a protective cover arrangement for a first electrical unit adapted to be mounted on a second electrical unit. The protective cover arrangement of the invention is particularly suitable for providing protection for the electronic units against moisture and/or dust.

BACKGROUND OF THE INVENTION

In some applications it is necessary to mount a first electrical unit onto a second electrical unit. This is, e.g., the case in compressors having a starter unit mounted thereon. The compressor is normally protected by a substantially sealed cover, normally denoted a compressor housing, but the starter unit is arranged outside this cover because it must be easily accessible for repair and maintenance. In order to protect the starter unit from impacts and direct sprays, e.g. from rain water, and in order to prevent unauthorized or accidental access to the electrical components of the starter unit, the starter unit is normally covered by a detachable cover. However, since the detachable cover must be easy to remove in order to provide easy access for authorized personnel to the starter unit, and because wiring or cables must be provided between the starter unit and an external power source in order to provide electrical power for the starter unit and the compressor, the detachable cover is normally not completely sealed. In particular, the cover often has a large opening in order to allow it to be mounted on the starter unit in a sliding manner. Moisture and dust can easily enter the cover, and thereby reach the starter unit, and possibly the compressor or connector pins for the compressor, via such a large opening. Accordingly, the detachable cover does not provide efficient protection against moisture and dust.

In one prior art compressor of the kind described above, the detachable cover has a large opening facing in a downwards direction during normal operation of the compressor. In the case that the application, e.g. a beverage dispenser, having the compressor installed therein is positioned in the street, there is a risk that sprays of water, e.g. originating from machines used for washing the street, enter the detachable cover via the downwardly facing opening or via the part facing the cover of the compressor. This may result in failure of electrical components of the starter unit. It is therefore desirable to provide additional protection for the starter unit against moisture and/or dust.

JP 2000 161221 discloses a connector for a compressor in which it has been attempted to solve the problem described above. In one embodiment of the connector of JP 2000 161221 the detachable cover has been redesigned in such a manner that the size of the opening allowing wiring to reach the starter unit is minimised. Thereby the risk of moisture and/or dust entering the detachable cover is reduced.

One disadvantage of the solution presented in JP 2000 161221 is that it is necessary to completely redesign the detachable cover in order to provide the desired additional protection for the electrical components of the starter unit.

SUMMARY OF THE INVENTION

It is, thus, an object of the invention to provide a cover arrangement for an electrical unit, the cover arrangement providing improved protection against moisture and/or dust, without requiring any adjustments of the design of existing components of the electrical unit.

It is a further object of the invention to provide a cover arrangement for an electrical unit, the cover arrangement providing improved protection against moisture and/or dust, and the cover arrangement being adapted to be directly installed on existing electrical units.

According to a first aspect of the invention the above and other objects are fulfilled by providing a protective cover arrangement for a first electrical unit, the first electrical unit being adapted to be mounted on a second electrical unit, the protective cover arrangement comprising:

an outer cover comprising one or more mounting parts adapted to cooperate with one or more corresponding mounting parts arranged on a second electrical unit in order to mount the outer cover on the second electrical unit, and
an inner cover being shaped and sized to fit in an interior part of the outer cover and being adapted to accommodate a first electrical unit in an interior part thereof, the inner cover comprising:
at least one opening adapted to allow one or more electrical connectors to pass from the second electrical unit to the interior part of the inner cover, and
a cable entry structure allowing one or more electrical cables to pass from the exterior of the protective cover arrangement to the interior part of the inner cover, said cable entry structure defining one or more cable guides, each defining a curved cable path.

The first electrical unit is adapted to be mounted on the second electrical unit. This should be interpreted to mean that the first electrical unit can be firmly attached to the second electrical unit, preferably in a detachable manner. Furthermore, the first electrical unit and the second electrical unit are preferably electrically connected, e.g. via one or more connector pins, wires, cables, etc.

The second electrical unit may advantageously be a compressor, and the first electrical unit may in this case be a starter unit for the compressor. However, other electrical units could alternatively be used.

The outer cover comprises one or more mounting parts. One or more corresponding mounting parts may be arranged on a second electrical unit onto which the protective cover arrangement is to be mounted. In this case, the mounting part(s) of the outer cover is/are adapted to cooperate with the mounting part(s) of the second electrical unit. Accordingly, the outer cover can be mounted directly on the second electrical unit by means of the mounting parts.

The inner cover is shaped and sized to fit in an interior part of the outer cover. Accordingly, the outer cover encloses the inner cover when the protective cover arrangement is assembled. Thereby the outer cover defines an outer boundary of the protective cover arrangement, the inner cover being arranged within this outer boundary. Thus, the outer cover normally provides protection against impacts and direct sprays, and prevents unauthorized or accidental access to the first electrical unit. These are the functions of the prior art cover described above, and the outer cover may, thus, advantageously be such a prior art cover. Since the inner cover fits inside the outer cover, the inner cover may simply be added to the arrangement without significantly changing the design of any of the other components of the arrangement, and without significantly changing the design of the first electrical unit and the second electrical unit. The inner cover may even be retrofitted onto operating electrical devices, thereby providing additional protection against moisture and/or dust in such electrical devices in an easy and cost effective manner, and without the requirement of replacement of major components.

The inner cover is adapted to accommodate a first electrical unit in an interior part thereof. Accordingly, the inner cover substantially encloses the first electrical unit when the protective cover arrangement is assembled and mounted on the first and/or the second electrical unit. Thus, the first electrical unit is protected by the inner cover as well as by the outer cover.

The inner cover comprises at least one opening adapted to allow one or more electrical connectors to pass from the second electrical unit to the interior part of the inner cover. Since the first electrical unit is arranged in the interior part of the inner cover, an electrical connection between the first electrical unit and the second electrical unit can thereby be established, via the opening(s) of the inner cover. Furthermore, the inner cover may advantageously be mounted on a second electrical unit by means of the one or more openings. This will be described further below.

The inner cover further comprises a cable entry structure allowing one or more electrical cables to pass from the exterior of the protective cover arrangement to the interior part of the inner cover. Since the first electrical unit is arranged in the interior part of the inner cover when the protective cover arrangement is assembled and mounted as described above, cables passing via the cable entry structure may provide electrical power to the first electrical unit, and possibly also for the second electrical unit via electrical connectors passing the at least one opening of the inner cover.

The cable entry structure defines one or more cable guides. Each cable guide defines a curved cable path. Thus, a cable passing from the exterior of the protective cover arrangement to the interior part of the inner cover follows a curved cable path, i.e. the cable has to bend in order to enter the interior part of the inner cover and reach a first electrical unit arranged therein. Thereby the passage(s) between the exterior of the protective cover arrangement and the interior of the inner cover is/are curved, rather than following straight lines. This inhibits, and may even prevent, passage of moisture and/or dust from the exterior of the protective cover arrangement to the interior of the inner cover. Accordingly, the special design of the inner cover provides improved protection for the first electrical unit arranged in the interior part of the inner cover against moisture and/or dust, while allowing electrical connections between the first electrical unit and external devices, such as an external power supply. Furthermore, as described above, the inner cover can easily be added to existing protective cover arrangements without significantly changing the design of the other components, and it may even be possible to retrofit the inner cover onto operating devices. Thereby it is possible to provide the additional protection against moisture and/or dust at minimum costs.

The outer cover may be adapted to retain the protective cover arrangement against a second electrical unit by means of the mounting part(s). According to this embodiment the outer cover encloses the inner cover, and thereby also the first electrical unit, and when the outer cover is mounted on the second electrical unit by means of the mounting part(s) it further holds the inner cover in position, retaining it against the second electrical unit. Accordingly, a firm grip of the mounting part(s) may advantageously ensure that the inner cover remains in a desired position, and it may thereby be ensured that the inner cover remains in sealing contact with the second electrical unit. It may furthermore be obtained that electrical connections between the first electrical unit and the second electrical unit are not interrupted, because retaining the inner cover will also, at least to some extent, immobilise the first electrical unit, since it is arranged in the interior part of the inner cover. This is, furthermore, obtained in a very easy manner, i.e. simply by allowing the outer cover to retain the inner cover.

The outer cover may be made from a wear resistant material. In the present context the term 'wear resistant' should be interpreted to mean that the material of the outer cover is capable of withstanding expected loads, e.g. in terms of impacts, frictional wear, weather conditions, etc. The level of required wear resistance depends on the intended application, in particular the intended position of the device. For instance, a higher level of wear resistance will be required for applications which are intended to be positioned in harsh environments, e.g. outdoors, than for applications which are intended to be positioned in more gentle environments, e.g. indoors.

Preferably, the outer cover is made from a material which is sufficiently hard to withstand impacts or strokes, even at increased temperature levels which may be expected during operation of the electrical units. The material may have a hardness within the interval 70 shore A to 130 shore A, such as within the interval 85 shore A to 115 shore A, such as approximately 100 shore A, such as approximately 62 shore D. The material is preferably an electrically insulating material in order to prevent that electrical currents are led from electrical components of the first electrical unit to the outer cover. Such currents could constitute a hazard to persons handling the device. The material may advantageously be polypropylene (PP).

The inner cover may comprise at least one sealing surface arranged at the one or more openings, said sealing surface(s) being adapted to provide sealing between the second electrical unit and the interior part of the inner cover. According to this embodiment the one or more openings can be arranged in sealing contact with the second electrical unit. Thereby it can be ensured that electrical connectors are allowed to pass from the second electrical unit to the interior part of the inner cover, without compromising the tightness of the inner cover. The inner cover may even be mounted on the second electrical unit via the one or more openings.

The inner cover may comprise a second opening adapted to allow a first electrical unit to pass into the interior part of the inner cover. Thereby it is easy to mount a first electrical unit in and/or remove a first electrical unit from the protective cover arrangement, since this can be done via the second opening. According to this embodiment the protective cover arrangement may advantageously be assembled by first mounting the inner cover on the second electrical unit by means of the one or more openings allowing passage of electrical connectors, and then mounting the first electrical unit in the interior part of the inner cover, via the second opening, and preferably by electrically connecting the first electrical unit and the second electrical unit via connector pins passing through the one or more openings. When the first electrical unit is mounted in the interior part of the inner cover, any cables connected to the first electrical unit, e.g. for establishing an electrical connection to an external power supply, should be positioned in the cable entry structure in such a manner that the cables follow the curved cable path(s).

The second opening may be provided with a sealing surface adapted to provide sealing between the outer cover and the interior part of the inner cover. The sealing surface may be in the form of a lining of the second opening. The sealing surface preferably defines an interface of the inner cover against the outer cover. When the inner cover is arranged in an interior part of the outer cover, the sealing surface abuts against the outer cover, and thereby the second opening is sealed, and the inner cover is accordingly sealed sufficiently to prevent moisture and/or dust from entering the interior part of the inner cover via the second opening. Thereby it is obtained that it is easy to gain access to the interior of the inner cover, and thereby to a first electrical unit arranged therein, while the tightness of the inner cover when the protective cover arrangement is in an assembled state is not compromised.

The inner cover may be constructed from a material having a Young's modulus which varies across the cross section of a wall part of the inner cover. Since Young's modulus is a measure of the stiffness of a material, the stiffness of the inner cover varies across the cross section of the wall part of the inner cover in this embodiment of the invention. The variation in Young's modulus may, e.g., be such that a part of the inner cover facing the interior part of the inner cover is relatively stiff while a part of the inner cover arranged oppositely, i.e. facing away from the interior part, is somewhat softer. As an alternative, which is currently preferred, the cross section may define a central part being relatively stiff, while the surface parts, i.e. the part facing the interior part as well as the surface part arranged oppositely, are somewhat softer. The stiffer parts serve to maintain the shape of the inner cover, while the softer parts may provide a sealing effect between the inner cover and other parts, such as the second electrical unit and/or the outer cover, as described above. The Young's modulus may vary slowly and continuously across the cross section of the wall part, or it may vary abruptly and discontinuously, e.g. at a boundary between two zones of the wall part, the zones possibly being made from different materials.

The variations in Young's modulus across the cross section may be substantial, even of the order of magnitude of the Young's modulus of one of the materials. In terms of hardness, which is a quantity being derivable from Young's modulus, the central part may have a hardness within the interval 70 shore A to 130 shore A, such as within the interval 85 shore A to 115 shore A, such as approximately 100 shore A, such as approximately 62 shore D. Alternatively or additionally, the surface parts may each have a hardness within the interval 20 shore A to 80 shore A, such as within the interval 35 shore A to 65 shore A, such as approximately 50 shore A.

The inner cover may comprise an inner part and an outer part substantially enclosing the inner part, the inner part and the outer part being made from different materials having differing Young's modulus. According to this embodiment the Young's modulus of the inner cover has one value at a central part of the cross section of the wall part and a different value at the surface parts. The variation in Young's modulus is obtained by manufacturing the inner cover from two different materials having differing Young's modulus. Thus, one of the materials is stiffer than the other material. Preferably, the material forming the inner or central part of the wall is stiffer than the material forming the outer or surface parts of the wall. Thereby it is obtained that the inner cover is able to maintain its shape, while a relatively resilient surface, e.g. having appropriate sealing properties, is provided. As an alternative, the inner or central part may be softer than the outer or surface parts.

Alternatively, the inner cover may be manufactured from a single material, and the variations in Young's modulus may be obtained in other ways, e.g. by treating the material in a specified manner. Alternatively, a sufficient stiffness of the inner cover as such, as well as sufficient sealing properties, could be obtained by varying the thickness of one or more walls of the inner cover, e.g. by increasing the thickness in certain positions, while decreasing the thickness in other positions, such as at or near surfaces where a sealing effect is desired.

The inner cover of the embodiment described above may advantageously be manufactured using an injection moulding technique, where a first material is first injected in such a manner that it covers the walls of the mould. A second material is then injected in such a manner that it fills a cavity formed by the first material. However, other suitable manufacturing techniques could be used, such as initially manufacturing an inner part, e.g. by means of an injection moulding technique, and subsequently applying the outer part, e.g. by means of an injection moulding technique performed in a different mould. It should be noted that the latter method is expected to be relatively expensive and time consuming, since it is necessary to use two different moulds, and because it is necessary to move the object from one mould to the other. Accordingly, the method described first is currently preferred.

The inner cover may be made from one or more plastic materials. As mentioned above, the inner cover may be injection moulded from two or more different materials in order to obtain a varying Young's modulus across a cross section of a wall part of the inner cover. Alternatively, the inner cover may be made from a single material. The Young's modulus may or may not, in this case, vary across the cross section. In a preferred embodiment, the inner cover is made from two different plastic materials, one forming a central part of the cross section of the wall part, and the other forming outer or surface parts of the cross section as described above. The two materials should be chosen in such a manner that each has a desired Young's modulus. Furthermore, the materials should be compatible in the sense that they are capable of joining at the boundary defined between them during the manufacturing process, e.g. by melting together during an injection moulding process. Once the two materials have been joined, they should be prevented from tearing apart, e.g. during a cooling or curing process following the initial manufacturing step. For instance, in the case an injection moulding process is used, materials having varying coefficients of thermal expansion would tear apart during cooling, and it is therefore advisable to choose materials having identical, or at least similar, coefficients of thermal expansion.

The central part may be made from polypropylene (PP) or polyethylene (PE), and/or the surface parts may be made from styrene-ethylene-butylene-styrene (SEBS) or a thermoplastic elastomer (TPE), such a thermoplastic vulcanizate (TPV).

According to a preferred embodiment, the central part may advantageously be made from Exxon PP7075L1, and the surface parts may advantageously be made from SEBS Kraiburg TF5EC N, preferably with a colorant to obtain a desired colour of the inner cover.

The cable entry structure may comprise a first part having a first surface and a second part having a second surface, said first and second surfaces being arranged opposite to each other and forming at least one cable guide there between. One or both of the surfaces may be substantially plane, or one or both of the surfaces may be curved. It is, however, important that the surfaces are arranged in such a manner that a cable passing through a cable guide defined by the surfaces is forced to follow a curved path. This may, e.g., be obtained by orienting the surfaces relatively to the remaining parts of the inner cover in such a manner that a cable entering the interior part of the inner cover via the cable guide defined by the surfaces is forced to change direction at least once. Alternatively, it may simply be obtained by using one or more surfaces having an appropriate curvature.

Thus, the first surface and/or the second surface may be curved.

Alternatively or additionally, the first surface and/or the second surface may be resilient. The resilience of the first surface and/or the second surface is preferably sufficient to allow the surfaces to 'follow' a cable passing between the surfaces in a smooth manner. Thereby the protection against moisture and/or dust provided by the inner cover is even further improved.

The first and/or the second surface may advantageously have a hardness within the interval 20 shore A to 80 shore A, such as within the interval 35 shore A to 65 shore A, such as approximately 50 shore A.

According to a second aspect of the invention the above and other objects are fulfilled by providing an inner cover for use in a protective cover arrangement according to the first aspect of the invention. As mentioned above, such an inner cover may be manufactured independently of the other parts of the protective cover arrangement, and it may thereby be retrofitted onto operating applications being provided with prior art cover arrangements. This is very advantageous, since it allows improved protection against moisture and/or dust in operating or new applications without requiring significant changes to the design of other components, such as the outer cover, the first electrical unit and the second electrical unit.

According to a third aspect of the invention the above and other objects are fulfilled by providing an electrical device comprising:
a first electrical unit,
a second electrical unit, the first electrical unit being adapted to be mounted on the second electrical unit, and
a protective cover arrangement according to the first aspect of the invention.

It should be noted that a person skilled in the art would readily recognise that any feature described in combination with the first aspect of the invention could also be combined with the second and third aspects of the invention, any feature described in combination with the second aspect of the invention could also be combined with the first and third aspects of the invention, and any feature described in combination with the third aspect of the invention could also be combined with the first and second aspects of the invention.

The third aspect of the invention, thus, relates to an electrical device having an assembled protective cover arrangement of the kind described above mounted thereon.

The second electrical unit may be a compressor, such as a compressor for use in a vapour compression system, e.g. a refrigeration system or a heat pump. In this case the first electrical unit may be a starter unit for the compressor. Such a starter unit is normally mounted on the compressor outside a protective cover, normally denoted a compressor housing, enclosing the compressor in order to provide easy access to the starter unit for the purpose of maintenance, repair or replacement of the starter unit, and in order to minimise manufacturing costs. Accordingly, the starter unit needs the protection which can be provided by a protective cover arrangement according to the first aspect of the invention.

Alternatively, other electrical units could be used, such as a lighting system wherein the second electrical unit is a lamp and the first electrical unit is a starter, or other electrical control unit, for such a lamp. Such lighting systems might include systems where the lamp is, for example, of a fluorescent tube type or a sodium vapour type. A further alternative might be an electrical heating system for hot water wherein the second electrical unit is an electrically heated hot water container or tank, and the first electrical unit is one or more of a connector to the heating element, a temperature measuring unit or a temperature controlled circuit breaker. Yet a further alternative is provided by any electrical equipment intended to be used out-of-doors and which requires connection to an electrical supply via a disconnectable connector. In this alternative the second electrical unit comprises the out-of-doors electrical equipment and the first electrical unit comprises the connector.

BRIEF DESCRIPTION OF THE DRAWINGS

The invention will now be described in further detail with reference to the accompanying drawings in which FIGS. 1a and 1b are perspective views of a cover arrangement according to an embodiment of the invention, shown in an exploded state, FIG. 2 is a cross sectional view of the exploded cover arrangement of FIG. 1, FIGS. 3 and 4 are perspective views of an inner cover for the cover arrangement of FIGS. 1 and 2, seen from two different angles.

DETAILED DESCRIPTION

Figure 1A:
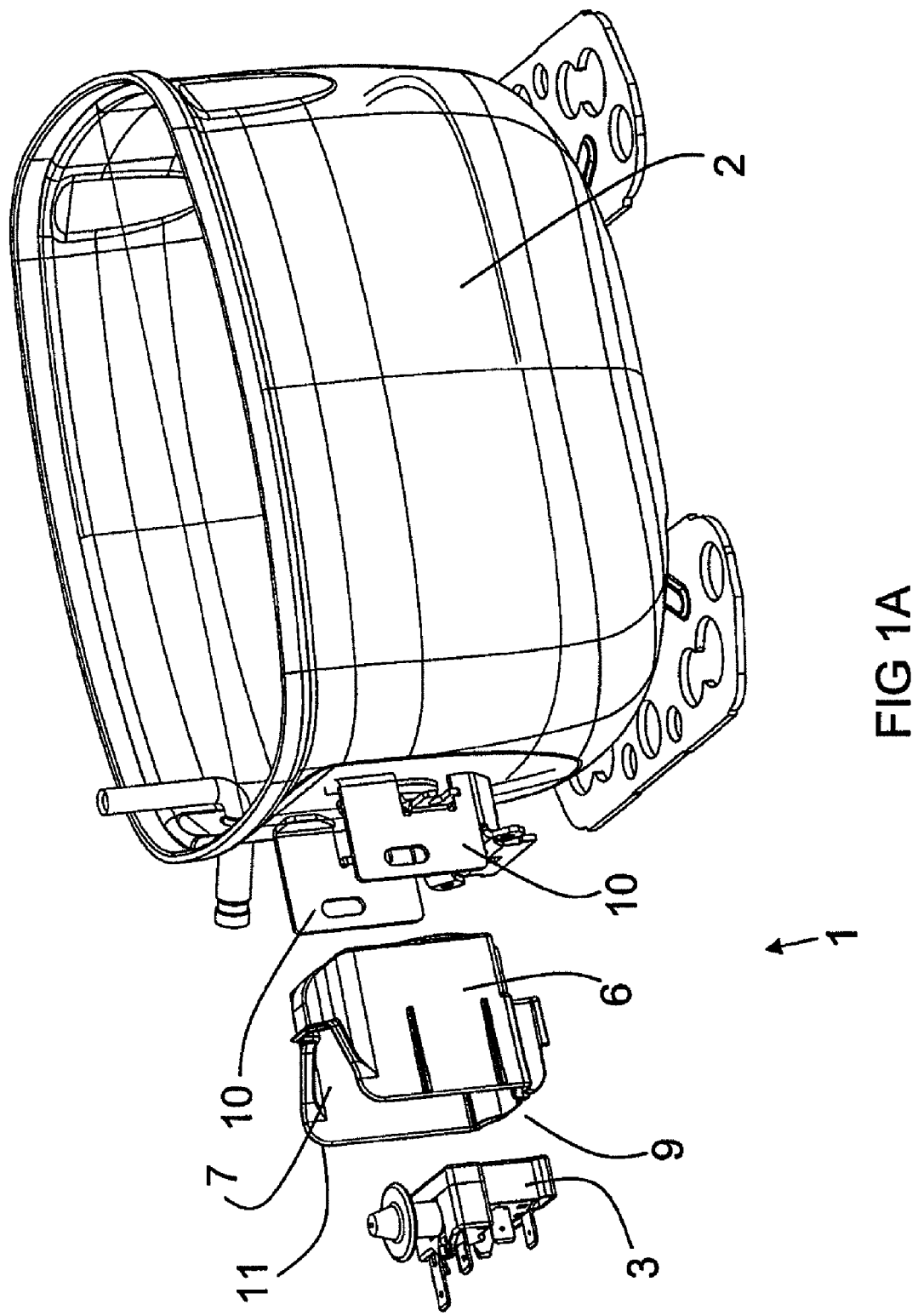

FIGS. 1a and 1b are perspective views of a protective cover arrangement 1 according to an embodiment of the invention, shown in an exploded state, i.e. with the individual parts disassembled from each other. FIG. 1 further shows a second electrical unit, which can be and shown herein as a compressor 2, shown in FIG. 1a, but not in FIG. 1b, and a first electrical unit, which can be and shown herein as a starter unit 3, the starter unit 3 being adapted to be mounted on the compressor 2. The cover arrangement 1 is adapted to protect the starter unit 3 as well as connector pins 4 for connecting the starter unit 3 to the compressor 2 from moisture and/or dust.

The cover arrangement 1 comprises an outer cover 5, shown in FIG. 1b, but not in FIG. 1a, and an inner cover 6. The inner cover 6 will be described in further detail below with reference to FIGS. 3-9. Furthermore, FIG. 1b shows a strain relief assembly 19 comprising a first part 19a and a second part 19b, the first part 19a and the second part 19b being detachable. The cover arrangement 1 shown in FIGS. 1a and 1b is assembled in the following manner. First the first part 19a of the strain relief assembly 19 is mounted in mounting hole 20 on the compressor 2. Then the inner cover 6 is mounted on the compressor 2 in such a manner that the connector pins 4 are allowed to pass into an interior part 7 of the inner cover 6 via an opening (not visible) formed in the inner cover 6. The opening is preferably lined by a resilient surface which can be arranged in sealing contact with the compressor 2. This will be described further below.

Next the starter unit 3 is mounted in the interior part 7 of the inner cover 6, and in such a manner that the connector pins 4 are connected to corresponding connecting sockets (not visible) on the starter unit 3. Cables (not shown) used for providing power to the starter unit 3 are allowed to pass through cable entry structure 9 formed on the inner cover 6 and through recesses 21 formed in the first part 19a of the strain relief assembly 19. The cables can thereby connect the starter unit 3 arranged in the interior part 7 of the inner cover 6 with an external power supply (not shown). The second part 19b of the strain relief assembly 19 is then attached to the first part 19a, and screws 22 are tightened in order to fixate the cables. The design of the cable entry structure 9 will be described in further detail below.

Finally, the outer cover 5 is mounted on the compressor 2 in such a manner that it covers the inner cover 6 and the starter unit 3 arranged in the interior part 7 of the inner cover 6. This is done by means of mounting parts 10 arranged on the compressor 2 and mating mounting parts 8 formed on the outer cover 5. Thereby the outer cover 5 firmly holds the inner cover 6 in place as previously described. Preferably, the inner cover 6 is provided with a lining 11 of resilient material forming a boundary against the outer cover 5. This allows the outer cover 5 and the inner cover 6 to be arranged in sealing contact with each other.

The outer cover 5 of the cover arrangement 1 shown in FIG. 1 is preferably of the kind which is used in prior art cover arrangements. It is an advantage that the inner cover 6 fits inside the outer cover 5 because additional protection against moisture and/or dust is thereby provided by means of an additional part, i.e. the inner cover 6, and no design changes of other parts, such as the outer cover 5, the compressor 2 or the starter unit 3, are required. This allows the inner cover 6 to be easily added to compressors 2, etc., without performing any substantial changes to the production lines or the production process. Furthermore, inner covers 6 may even be retrofitted onto compressors 2 which are already operating, thereby providing additional protection for such compressors 2 in an easy and cost effective manner.

FIG. 2 is a cross sectional view of the cover arrangement 1 of FIG. 1. In FIG. 2 the opening 12 formed in the inner cover 6 in order to allow the connector pins 4 to pass into the interior part 7 of the inner cover 6 is visible.

Figures 3, 4:
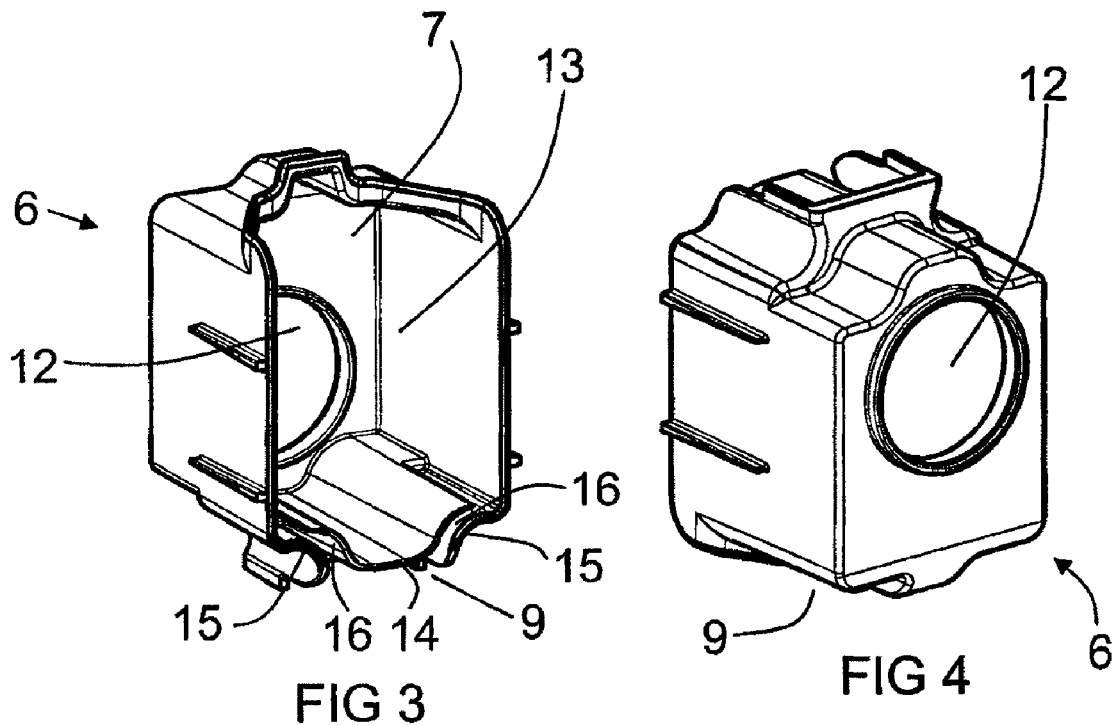

FIG. 3 is a perspective view of an inner cover 6 for the cover arrangement of FIGS. 1 and 2. The inner cover 6 comprises a large opening 13 allowing insertion of a first electrical unit, e.g. in the form of a starter unit, and a smaller opening 12 adapted to allow connector pins from a second electrical unit, e.g. in the form of a compressor, to enter the interior part 7 of the inner cover 6. The inner cover 6 is further provided with a cable entry structure 9 in the form of a first curved surface 14 attached to the inner cover 6 at a position close to the connector pin opening 12, and two additional curved surfaces 15, each constituting an end of a side surface of the inner cover 6. Each of the additional surfaces 15 overlap a part of the first surface 14, and these overlapping regions prevent direct passage from outside the inner cover 6 to the interior part 7 of the inner cover 6, at least when the large opening 13 is arranged in sealing contact with a corresponding outer cover, and the smaller opening 12 is arranged in sealing contact with a second electrical unit. However, the first surface 14 and the additional surfaces 15 form passages 16 from outside the inner cover 6 to the interior part 7 of the inner cover 6, and cables are allowed to pass via these passages 16. Accordingly, the passages 16 define curved cable paths, i.e. the cables must curve in order to pass through the passages 16. Thereby it is possible to provide electrical power to a first electrical unit, such as a starter unit for a compressor, arranged in the interior part 7 of the inner cover 6, via the curved cable paths. Simultaneously, entry of moisture and/or dust via the cable entry structure 9 is inhibited because moisture and dust will normally not move in a curved pattern, and the curvature of the passages 16 will therefore prevent or at least inhibit such entry.

FIG. 4 is a perspective view of the inner cover 6 of FIG. 3 seen from an opposite angle. Thus, in FIG. 3 the opening 12 for connector pins can clearly be seen.

Figure 5:
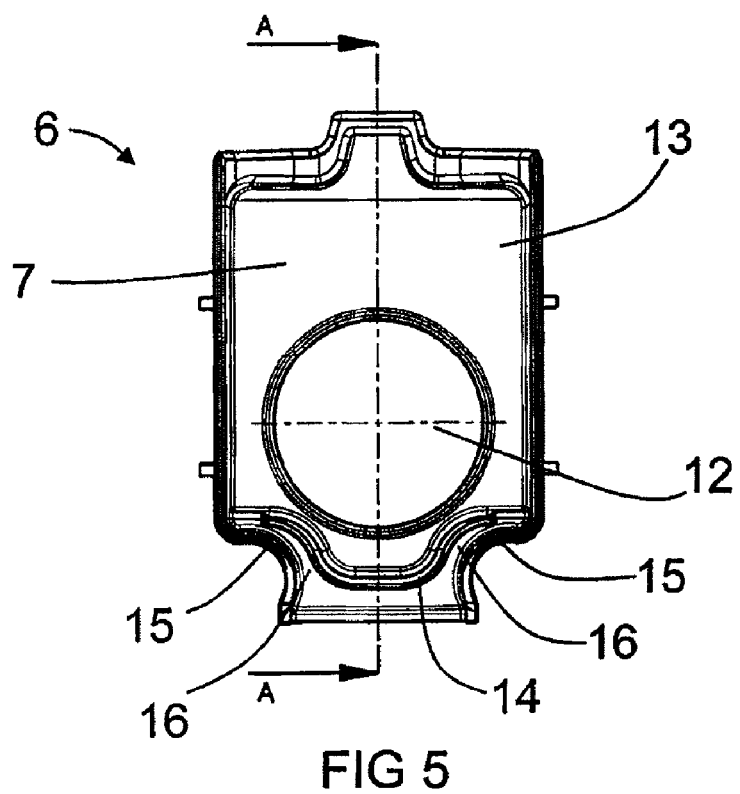
FIG. 5 shows the inner cover of FIGS. 3 and 4 from behind, i.e. viewing in a direction into the inner cover via a large opening.

FIG. 5 shows the inner cover of FIGS. 3 and 4 seen from behind, i.e. through the large opening 13. The relative positions of the first surface 14 and the additional surfaces 15 are clearly seen. It is also clearly seen that the surfaces 14, 15 define curved passages 16 for introducing cables into the interior part 7 of the inner cover 6.

Figure 6:
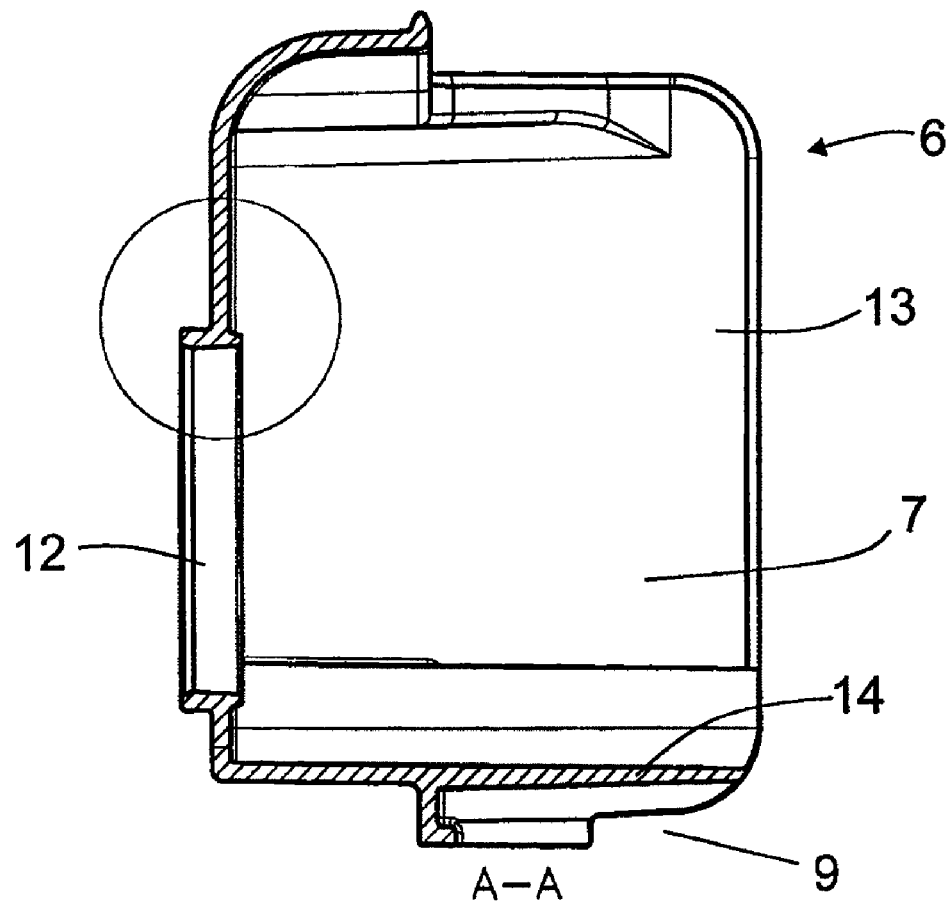
FIG. 6 is a cross sectional view of the inner cover of FIGS. 3 and 4 along the line A-A shown in FIG. 5.

FIG. 6 is a cross sectional view of the inner cover 6 of FIGS. 3 and 4 along the line A-A shown in FIG. 5. It can be seen from FIG. 6 that the thickness of the walls of the inner cover 6 varies slightly. In particular, the thickness of the first curved surface 14 varies in such a manner that the thickness decreases along a direction from the connector pin opening 12 towards the large opening 13.

Figure 7:
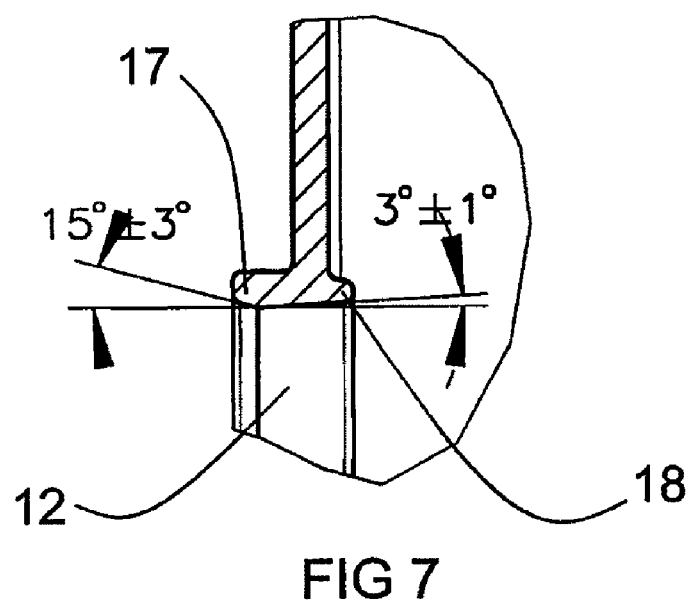
FIG. 7 is a detail of FIG. 6.

FIG. 7 is a detail of FIG. 6 illustrating an upper part of the opening 12. It can be seen that the part of the opening which forms a boundary 17 against the second electrical unit when the inner cover 6 is mounted thereon, defines an angle of approximately 15° with respect to a horizontal plane. Furthermore, the opposite part 18 of the opening 12 defines an angle of approximately 3° with respect to the horizontal plane. These angles make it easy to mount the inner cover 6 on the second electrical unit while ensuring that a sealing contact between the inner cover 6 and the second electrical unit is obtained.

Figure 8:
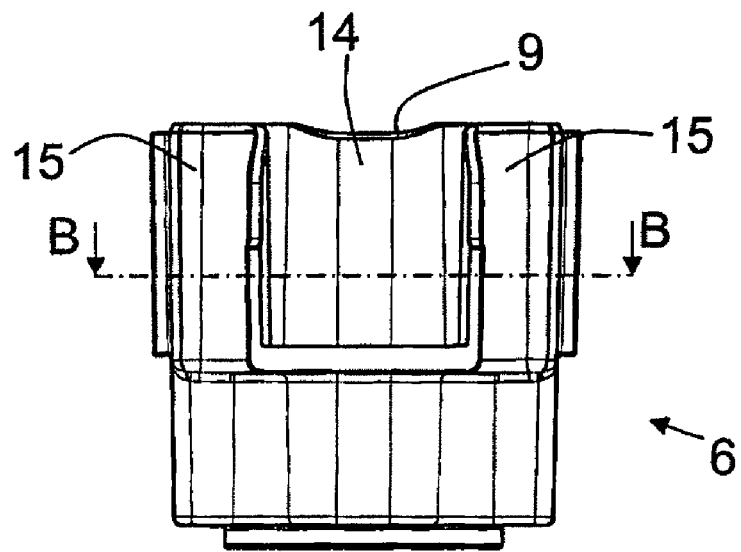
FIG. 8 shows the inner cover of FIGS. 3 and 4 from below.

FIG. 8 shows the inner cover 6 of FIGS. 3 and 4 seen from below, i.e. from the side where the cable entry structure 9 is arranged. It is clear from FIG. 5 that the special construction of the cable entry structure 9 with the overlapping surfaces 14, 15 has the consequence that there is no direct or linear passage from outside the inner cover 6 to the interior part of the inner cover 6.

Figure 9:
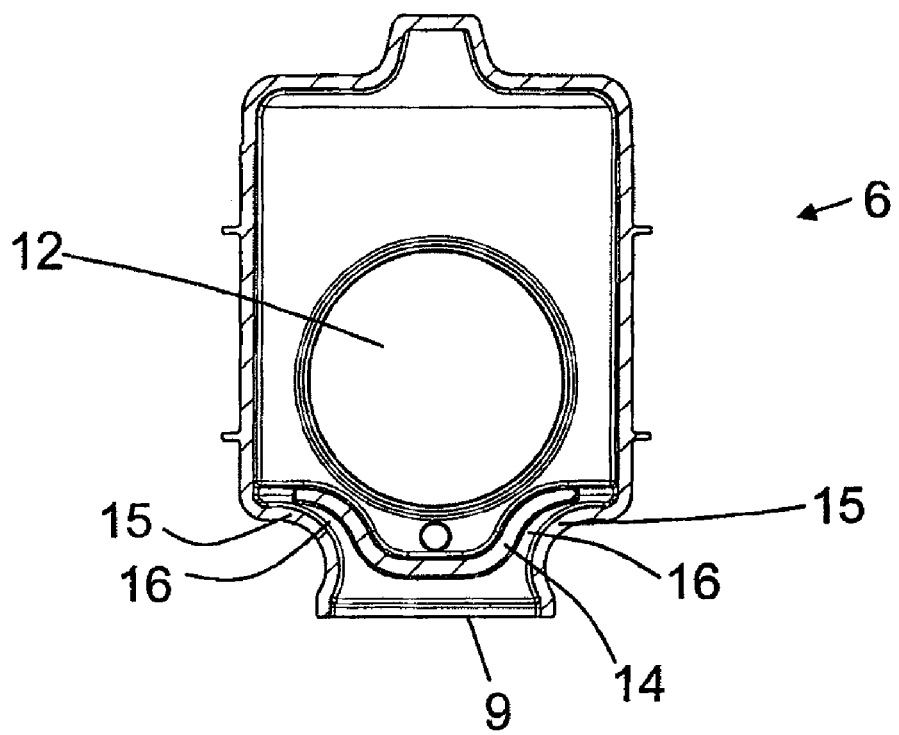
FIG. 9 is a cross sectional view of the inner cover of FIGS. 3 and 4 along the line B-B shown in FIG. 8.

FIG. 9 is a cross sectional view of the inner cover 6 of FIGS. 3 and 4 along the line B-B shown in FIG. 8. Since the cross section goes through the cable entry structure 9, this can clearly be seen. Accordingly, the relative positions of the surfaces 14, 15, the overlapping portions and the curved passages 16 are visible. Furthermore, it can be seen that each of the additional surfaces 15 constitutes an end of a side surface of the inner cover 6.

Figure 10:
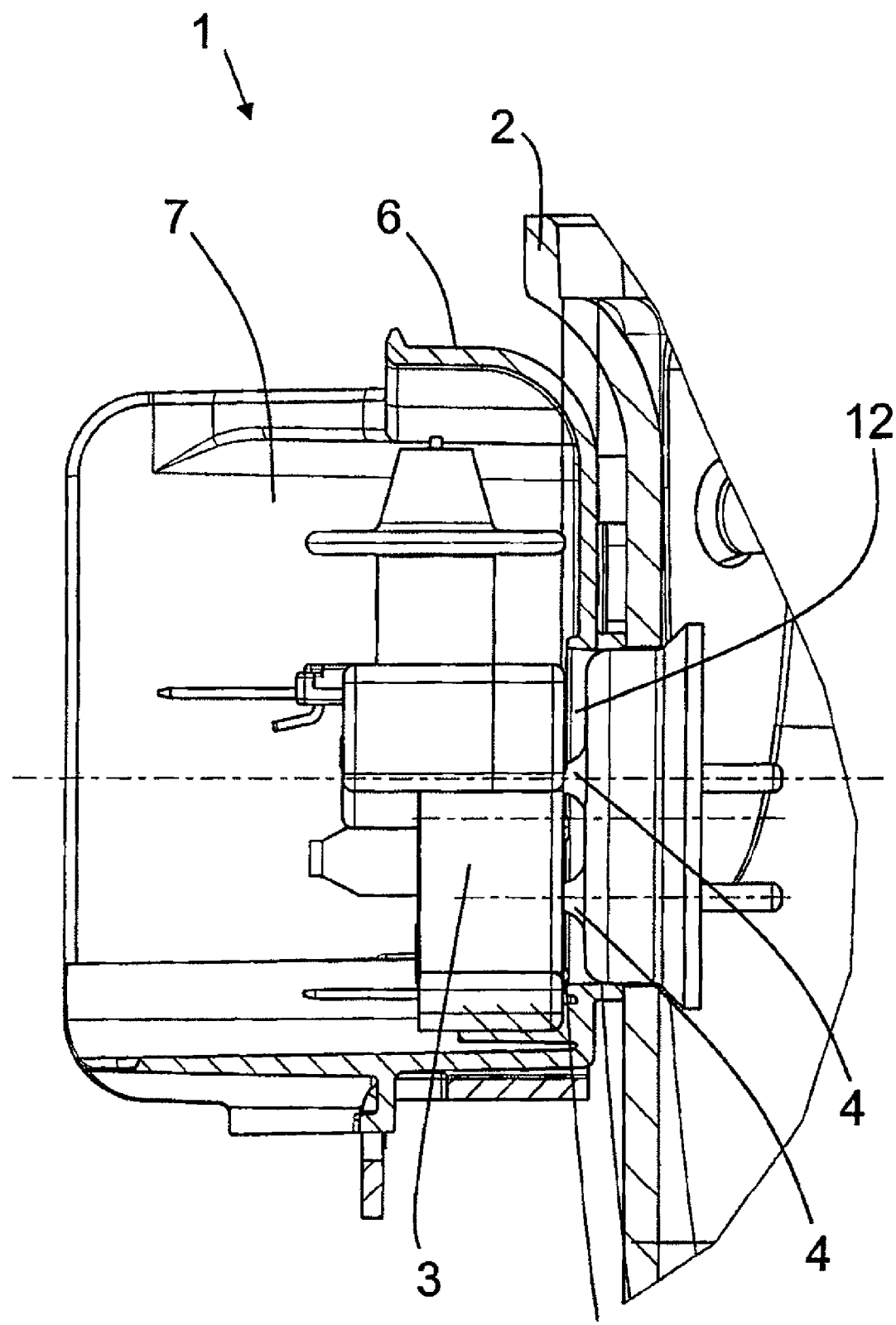
FIG. 10 is a cross sectional view of the cover arrangement of FIGS. 1 and 2 in an assembled state, with the outer cover omitted.

FIG. 10 is a cross sectional view of the cover assembly 1 of FIGS. 1 and 2 in an assembled state. For the sake of clarity the outer cover has been omitted. In FIG. 10 the inner cover 6 is mounted on the compressor 2 with the connector pin opening 12 tightly fitted around the position of the connector pins 4. The starter unit 3 is arranged in the interior part 7 of the inner cover 6 and connected to the connector pins 4, thereby establishing electrical contact between the starter unit 3 and the compressor 2.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A protective cover arrangement for a first electrical unit, the first electrical unit being adapted to be mounted on a second electrical unit, the protective cover arrangement comprising:
- an outer cover comprising one or more mounting parts adapted to cooperate with one or more corresponding mounting parts arranged on the second electrical unit in order to mount the outer cover on the second electrical unit, and
- an inner cover being shaped and sized to fit in an interior part of the outer cover and being adapted to accommodate the first electrical unit in an interior part of the inner cover, the inner cover comprising:
  - at least one opening adapted to allow one or more electrical connectors to pass from the second electrical unit to the interior part of the inner cover, and
  - a cable entry structure allowing one or more electrical cables to pass from the exterior of the protective cover arrangement to the interior part of the inner cover, said cable entry structure defining one or more curved passages.

2. The protective cover arrangement according to claim 1, wherein the outer cover is adapted to retain the protective cover arrangement against the second electrical unit by means of the mounting part(s).

3. The protective cover arrangement according to claim 1, wherein the outer cover is made from a wear resistant material.

4. The protective cover arrangement according to claim 1, wherein the inner cover comprises at least one sealing surface arranged at one or more openings, said sealing surface(s) being adapted to provide sealing between the second electrical unit and the interior part of the inner cover.

5. The protective cover arrangement according to claim 1, wherein the inner cover comprises a second opening adapted to allow the first electrical unit to pass into the interior part of the inner cover.

6. The protective cover arrangement according to claim 5, wherein the second opening is provided with a sealing surface adapted to provide sealing between the outer cover and the interior part of the inner cover.

7. The protective cover arrangement according to claim 1, wherein the inner cover is constructed from a material having a Young's modulus which varies across the cross section of a wall part of the inner cover.

8. The protective cover arrangement according to claim 7, wherein the inner cover comprises an inner part and an outer part substantially enclosing the inner part, the inner part and the outer part being made from different materials having differing Young's modulus.

9. The protective cover arrangement according to claim 1, wherein the inner cover is made from one or more plastic materials.

10. The protective cover arrangement according to claim 1, wherein the cable entry structure comprises a first part having a first surface and a second part having a second surface, said first and second surfaces being arranged opposite to each other and forming at least one curved passage there between.

11. The protective cover arrangement according to claim 10, wherein at least one of the first surface and the second surface is curved.

12. The protective cover arrangement according to claim 10, wherein at least one of the first surface and the second surface is resilient.

13. An electrical device comprising:
- a first electrical unit,
- a second electrical unit, the first electrical unit being adapted to be mounted on the second electrical unit, and
- a protective cover arrangement comprising:
  - an outer cover comprising one or more mounting parts adapted to cooperate with one or more corresponding mounting parts arranged on the second electrical unit in order to mount the outer cover on the second electrical unit, and
  - an inner cover being shaped and sized to fit in an interior part of the outer cover and being adapted to accommodate the first electrical unit in an interior part of the inner cover, the inner cover comprising:
    - at least one opening adapted to allow one or more electrical connectors to pass from the second electrical unit to the interior part of the inner cover, and
    - a cable entry structure allowing one or more electrical cables to pass from the exterior of the protective cover arrangement to the interior part of the inner cover, said cable entry structure defining one or more curved passages.

14. The electrical device according to claim 13, wherein the second electrical unit is a compressor.

15. The electrical device according to claim 14, wherein the first electrical unit is a starter unit.

* * * * *